3,466,127
PRESERVING PHOTOSTORED IMAGES
Charles R. Hauer, Newton Lower Falls, Mass., assignor to Technical Operations, Incorporated, Burlington, Mass., a corporation of Delaware
Filed Aug. 31, 1966, Ser. No. 576,412
Int. Cl. G03b 27/52, 27/68
U.S. Cl. 355—40
2 Claims

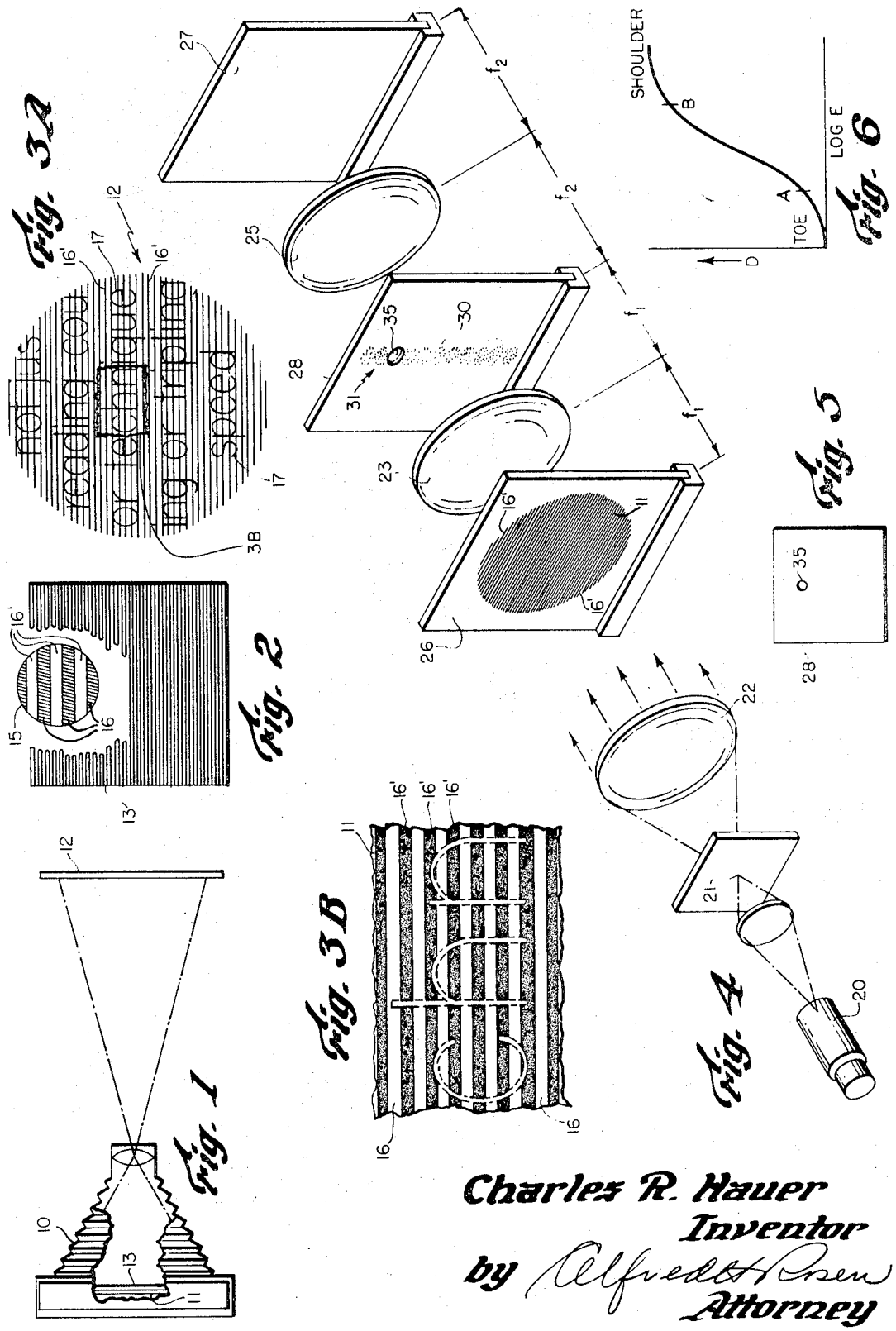

ABSTRACT OF THE DISCLOSURE

A method and structure for photostoring images on a recording medium in multiplication with a spatial carrier in such a way as to permit retrieval of the image from the record despite fogging, fading, or other degrading forces which might operate on the photostorage medium either before or after the image recording step.

BACKGROUND OF THE INVENTION

In the archival storage of photostored images, such as microfilm records, deterioration of the stored image can occur as a result of fogging or fading of the storage medium to the extent that discernible contrast between the image and its background vanishes. Fogging can be caused chemically or by radiation, which latter can be due, for example, to heating, or ambient photons (e.g. gamma rays, X-rays) from one source or another. Fading can occur upon chemical deterioration of the developed silver of a silver halide medium, for example. The storage life of archival records on photostorage media is measured by the success achieved in preventing such deterioration. This invention relates to an optical method and means for so storing an image on a photostorage material that the image can be retrieved from (1) a pre-fogged or subsequently fogged background even though the background be catastrophically fogged so that the image is not visible to the eye, or (2) a faded storage medium in which fading has progressed to the point where the eye cannot discern the stored image against even a faintly fogged background. The invention is therefore useful for retrieving a stored image from a medium which is fogged or faded without regard to the source of fogging or fading, or the time of fogging or fading (i.e.: before or after making the exposure, or developing it).

According to the invention, the stored image is written onto the storage medium on a spatial carrier frequency, and is read out of the storage medium by Fourier transform techniques with spatial filtering. For example, the image is modulated with a periodic function, so that it appears as a television picture with its raster resolved. The modulation has been found to remain with the image notwithstanding fogging or fading of the storage medium to a degree which renders the stored image indistinguishable from the background as far as the eye can determine. Then, by Fourier transform techniques, diffraction orders of the modulating function convolved with the image spectrum are erected in the transform plane spatially separate from the image spectrum of the background, which, lacking the spatial carrier frequency modulation, falls in the zero order, and by spatial filtering one or more of the diffraction orders may be passed to and brought to focus in an image plane for viewing or recording free of the background. This process is found also to provide contrast enhancement of the stored image, which further extends the useful life of archival records made on a photostorage medium.

A photostorage medium for the purposes of this invention is defined as a medium which, at least for a period of time, is sensitive to light such that an image of light intensity variations can be impressed upon the medium and will be retained thereby in some form for an extended period of time. Photographic and electrophotographic films and plates are exemplary. A spatial carrier frequency, for the purposes of this invention, can be provided by any device which effects a periodic modulation of the light used to make the image, as a function of the spatial coordinates of the image. Diffraction gratings, such as one having an amplitude transmission in the form of a square wave function (e.g.: a Ronchi ruling), or one having an amplitude transmission in the form of a simple harmonic function, are examplary, it being understood, however, that any grating which imposes on an incident light wave a periodic variation of intensity may be used.

If a diffraction grating is positioned in the front focal plane of a lens and is illuminated by collimated light from a point source, the diffraction pattern in the back focal plane of the lens (called the Fourier transform plane) will appear as a series of dots extending in a line perpendicular to the lines of the grating about the optic axis. If an object, in the form of an image on a photographic transparency, for example, is placed with the grating in the front focal plane of the lens, a diffraction pattern of the grating convolved with the object spectrum appears in the transform plane. Thus, at each diffraction order of the grating an object spectrum is found. A second lens can be placed at its own focal length beyond the transform plane and it will retransform the diffraction pattern back to the transparency image (the object) and the grating. If this retransformation is displayed on a screen in the back focal plane of the second lens, it will appear as the object and the grating, one superposed on the other. An opaque mask positioned in the transform plane, and having transparent apertures passing two or more of the diffraction orders, the apertures being large enough to pass the object spectrum centered at each order, will have no effect on the displayed transformation. If the mask has only one aperture, passing only one diffraction order, (i.e.: only one object spectrum) it will display a retransformation image of the object without the grating; this is so because the spacing of the diffraction orders is related to the grating periodicity, and when only one order is passed the period information (i.e.: the periodic modulation) is lost.

The mask placed in the transform plane is technically known as a "spatial filter." A spatial filter may be defined as a device placed in the Fourier transform plane of an optical system for modifying amplitude and/or phase of one or more selected spatial frequencies. In the foregoing example, this "modifying" is a blocking by absorption or reflection of all but one or more selected diffraction orders in the transform plane.

DESCRIPTION OF THE INVENTION

It is a principal object of the present invention to provide methods and means to make photostored images in a photo-storage medium in a manner which permits retrieval of the image from a prior- or a subsequently-occurring background against which the image exhibits no discernible contrast.

It is another object of the invention to extend the useful life of archival storage of photostored images.

It is another object of the invention to extend the utility of photographic processes in the presence of conditions which cause fogging or fading of photostorage media.

Another object of the invention is to render photostored images retrievable from background fog by writing the stored signal on a spatial carrier frequency.

These and other objects and features of the invention will become readily apparent from the following description of an exemplary embodiment. This description refers to the accompanying drawings, wherein:

FIG. 1 is a diagrammatic illustration of a camera system for making exposures in accordance with the invention;

FIG. 2 illustrates a diffraction grating suitable for use in practising the invention;

FIGS. 3A and 3B illustrate diagrammatically an exposure made in accordance with the invention;

FIG. 4 is a schematic projection of an optical system for readout of images stored in accordance with the invention;

FIG. 5 illustrates a spatial filter for use in the transform plane of the optical system of FIG. 4; and FIG. 6 represents a "typical" H and D curve as known in photography.

FIG. 1 shows a camera 10 containing a photographic plate 11, for exposure to incoherent light, such as ambient light. An object 12 to be photographed could be, for example, a printed page having letters 17 on it. It can also be any usual subject of photography. The object 12 is imaged onto the photographic plate 11 through a diffraction grating 13, which is in contact with the plate. When the object 12 is a printed page or similar two-dimensional article, the grating 13 may be positioned immediately adjacent to photographic plate 11, as shown in FIG. 1; or the object 12 and grating 13 can be otherwise optically multiplied so that they are imaged at the photographic plate 11 as a product. For purposes of the invention it is critical that the grating and the object be imaged on the photostorage member as a product, and not as a sum. Since it is desirable to limit the image resolution to a frequency less than that of the grating, it is sometimes preferable to position the grating adjacent to the film. This permits using the camera itself to limit the resolution of the image. Image resolution can be limited by stopping the camera lens down, by defocusing or by introducing a grained filter.

The diffraction grating 13 is illustrated in greater detail in FIG. 2, as a grating of periodic opaque and transparent bars. A small section 15 of the grating 13 is illustrated greatly enlarged for descriptive purposes. Referring to the enlarged portion 15, black bars 16 are opaque while the narrow bars 16' between them are transparent. A period of the grating is the width of one "line pair," consisting of the width of one transparent bar plus the width of one opaque bar.

Perhaps the most common gratings are called "Ronchi rulings" in which the width of the opaque bars and the transparent bars is identical. While Ronchi rulings are operative in the present invention, other forms of devices for modulating the image recording energy with a spatial carrier frequency are also useful, as is indicated above. The showing of FIG. 2 is exemplary only.

FIG. 3A illustrates diagrammatically the relationship between an exposure of a printed page 12 and the grating 13 superimposed on it. The horizontal lines 16' represent the locations of the spaces 16' between black bars 16 in the grating 13. Where these spaces 16' pass light from the page 12 an image of the portions of the page as seen through the spaces is recorded on the plate 11, as is shown in greater detail in FIG. 3B. Portions of the page 12 which are blocked by the opaque bars 16 appear as unexposed bars in the plate 11, both the text and the background being blocked. If the letters 17 are "black" on "white" paper, the page 12, which normally would produce white letters on black areas in a photographic negative, now produce black areas on bars 16' on the plate 11, these bars being interrupted by less dense areas where they cross the letters 17.

FIG. 3B illustrates this situation, with the letters "*chn*" illustrated in dotted outline. It will be seen also in FIG. 3B that there must be enough pairs of bars 16 and 16' (i.e. "line pairs") in the image stored on plate 11 to define the letters 17. In practice this requires at least five (5) line pairs of the grating for each letter. It is known from the sampling theorem that the highest frequency in the image is half the frequency of the grating. Thus, if the photostorage medium has a resolution capability of 180 lines per millimeter, the grating cannot exceed 180 line pairs per millimeter, and hence the stored image will be limited to not more than 90 lines per milllimeter. Since printed letters even in microfilm are of the order of one millimeter high, it will be appreciated that in a practical case FIG. 3B may show fifty or more grating line pairs in the space of one letter 17. In one example requiring that an image having as its highest spatial frequency 6 line pairs per millimeter, a grating of 12 line pairs per millimeter was successfully used.

Although FIGS. 3A and 3B show the printed lines of text as parallel with the grating lines, this is only for simplicity of illustration. The printed lines need not run parallel to the grating lines.

The spatial carrier frequency has effect only on the light impinging upon the storage medium 11 which is modulated by the grating. Light, or any other radiation incident on the storage medium 11 without modulation by the grating, for example before or after the exposure, will cause general fogging of the storage medium. For example, optical fogging may be allowed to occur when the modulating means is not present, or alpha, gamma, or X-ray fogging may be allowed to occur even when the modulating means (i.e.: the grating) is present. The process of development of a photographic medium is known to produce some general fogging. Chemically as well as thermally induced deterioration can produce general fogging of photo-storage media, both before and after development of them.

For a better understanding of this phase of the invention reference is now made to FIG. 6, which illustrates a typical curve of density against log exposure (H and D curve) for silver halide photostorage media, as described by Mees "The Theory of the Photographic Process" revised edition 1954 (MacMillan) pages 166; 896. The useful portion of this curve is customarily regarded as the linear, or nearly linear portion between points A and B. The toe and shoulder portions represent periods of under-exposure and over-exposure, respectively. It is known that a fog density may exist in or around the toe, arising from the small amount of silver that is developed even when no exposure is given. The shoulder represents a period of decreasing slope of the curve, in which the density approaches asymptotically a saturation level, at which all the silver halide is reduced to silver, though a small amount may remain unreduced. The shoulder is a consequence of the asymptotic approach to completion shown by most chemical reactions (Mees, page 165). The useable limits of the exposure scale are between the toe and the shoulder (Mees, page 896). It is thus to be expected that catastrophic fogging of a photostorage medium before or after an image has been placed on it will destroy the image, or make it impossible to retrieve, owing to the tendency of the recording process to go to completion throughout the entire recording medium. So also, bearing in mind that some fog density is always expected to be present, the fading of an image into the background fog can be expected to render the image eventually irretrievable.

I have discovered that if the stored image is written onto the storage medium on a spatial carrier frequency it can be read out of the storage medium by Fourier transform techniques with spatial filtering, regardless of the apparent lack of difference in density between the image and the background fog, even if a silver halide photostorage medium is used which is catastrophically fogged so that it appears uniformly black to the eye. A suitable read-out optical system is illustrated, by way of example only, in FIG. 4.

FIG. 4 illustrates a fairly conventional coherent optical system comprising light source 20, pin hole aperture 21, collimating lens 22, converging lenses 23 and 25 separated by the sum of their focal lengths $f_1$ and $f_2$, frame means 26 for supporting an object, and support means in the back focal plane 27 of the second lens 25 for supporting a photosensitive medium or a display screen. Focal plane 27 is the image plane of the system. A spatial filter 28 is shown in the back focal plane of lens 23 and the front focal plane of lens 25.

For purposes of the invention the light source 20 may be an arc lamp or a laser. A mercury arc lamp has been used in practising the invention.

The pin hole aperture 21 is used to increase the coherency of the light and collimating lens 22 following the aperture provides a collimated beam of a selected diameter. With a collimated beam the distance between the collimator and the rest of the system becomes noncritical. With an uncollimated beam magnification can be obtained.

The position of filter 28 in the back focal plane of lens 23 is called the Fourier transform plane. It can be seen that the collimated beam from collimating lens 22 will be brought to a point focus at the transform plane. If the beam is not collimated, the optical system must be arranged so that the beam is nevertheless brought to a focus at the transform plane.

Light from the source 20 must be at least partially coherent at the illumination plane where an object supported in the frame 26 is illuminated. The required degree of coherence is related to the grating spacing. Preferably the coherence length (the distance between two extreme points of coherence in the illumination plane) is greater than a few periods of the grating.

With a photostored image on plate 11 (for example, in the form of a transparency) positioned in the frame 26 in the illumination plane, a diffraction pattern due to the spatial carrier frequency modulation will appear in the transform plane. This diffraction pattern is shown at filter 28. Collimated light that is undisturbed by the transparency will be focused to the center of the transform plane as a spot illustrated at the central illumination spot 30. This spot represents the zero order of the grating, and is commonly called the DC spot. One of the purposes of the spatial filter 28 is to block the DC spot. A vertical series of spots 31 represent the diffraction orders of the grating. Extending out in both directions beyond the zero order are the first, second, third, fourth and fifth diffraction orders.

The spatial filter is opaque except at an aperture 35, which is located to pass one diffraction order (here, by way of example only, a third order) of the grating, convolved with the image spectrum. An image of the original text 17 appears in the image plane 27, completely free of any background fog on the plate 11. A viewing screen or a recording medium may be supported here to display or to record this image.

While the invention has been described in relation to specific embodiments, various modifications thereof will be apparent to those skilled in the art and it is intended to cover the invention broadly within the spirit and scope of the appended claims.

I claim:

1. In an information storage and retrieval system employing image-wise exposure of a photostorage medium as the information storage means, the process of recording an image representing the information so that it can be retrieved from background fog comprising the steps of providing a source of image-wise exposure representing the information, exposing the photostorage medium to said source while modulating the exposure with a spatial carrier frequency varying as a function of position in the photostorage medium, denying said modulation to fog-producing forces, illuminating the photostorage medium containing said image with light which is coherent over at least a few periods of said spatial carrier frequency, forming a Fourier transform of said image containing the zero order and at least one diffraction order of said spatial carrier frequency convolved with the spectrum of said image, blocking said zero order, passing said diffraction order to an image plane and erecting in said image plane a reproduction of said source substantially free of background fog of said medium.

2. In an information storage and retrieval system employing image-wise exposure of a photostorage medium as the information storage means, the process of recording an image representing the nformation so that it can be retrieved from background fog comprising the steps of providing a source of image-wise exposure representing the information, locating between the source of image-wise exposure and the photostorage medium a grating which imposes on an incident light wave a periodic variation of intensity, said grating being so located that the image is formed in the photostorage medium as the product of said source and said grating, denying said modulation thus produced to fog-producing forces, illuminating the photostorage medium containing said image with light which is coherent over at least a few periods of said grating, forming a Fourier transform of said image containing the zero order and at least one diffraction order of said grating convolved with the sepctrum of said image, blocking said zero order, passing said diffraction order to an image plane and erecting in said image plane a reproduction of said source substantially free of background fog of said medium.

References Cited

UNITED STATES PATENTS

| 2,805,599 | 9/1957 | Pajes | 88—24 |
| 3,313,623 | 4/1967 | Bixby | 88—24 X |

NORTON ANSHER, Primary Examiner

W. A. SIVERTSON, Assistant Examiner

U.S. Cl. X.R.

350—162; 355—52